United States Patent
Lin et al.

(10) Patent No.: US 8,963,781 B2
(45) Date of Patent: Feb. 24, 2015

(54) RFID TAG ANTENNA FOR ATTACHED ON HIGH CONDUCTIVE OBJECT

(71) Applicant: National Taipei University of Technology, Taipei (TW)

(72) Inventors: Ding-Bing Lin, Taipei (TW); Chao-Chieh Wang, Taipei (TW)

(73) Assignee: National Taipei University of Technology, Taipei (TW)

( * ) Notice: Subject to any disclaimer, the term of this patent is extended or adjusted under 35 U.S.C. 154(b) by 333 days.

(21) Appl. No.: 13/625,520

(22) Filed: Sep. 24, 2012

(65) Prior Publication Data
US 2013/0120197 A1    May 16, 2013

(30) Foreign Application Priority Data

Sep. 22, 2011    (TW) .............................. 100134243 A (51) Int. Cl.
| | |
|---|---|
| *H01Q 1/38* | (2006.01) |
| *H01Q 1/22* | (2006.01) |
| *H01Q 9/04* | (2006.01) |
| *H01Q 23/00* | (2006.01) |
| *G06K 19/077* | (2006.01) |

(52) U.S. Cl.
CPC .............. *H01Q 1/38* (2013.01); *H01Q 1/2225* (2013.01); *H01Q 9/0407* (2013.01); *H01Q 9/0442* (2013.01); *H01Q 9/045* (2013.01); *H01Q 23/00* (2013.01); *G06K 19/07786* (2013.01)

USPC ..................................... 343/700 MS; 343/702

(58) Field of Classification Search
CPC ..... H01Q 1/38; H01Q 9/0407; H01Q 9/0421; H01Q 1/243; H01Q 5/0003
USPC .................. 343/700 MS, 702, 904, 905, 767; 340/572.7, 572.8; 29/601
See application file for complete search history.

(56) References Cited

U.S. PATENT DOCUMENTS

| | | | | |
|---|---|---|---|---|
| 7,055,754 B2 * | 6/2006 | Forster | .......................... | 235/492 |
| 2007/0290941 A1 * | 12/2007 | Brown et al. | ................. | 343/842 |
| 2009/0213027 A1 * | 8/2009 | Finn | .............................. | 343/866 |
| 2010/0007570 A1 * | 1/2010 | Sardariani et al. | ............ | 343/797 |
| 2011/0115685 A1 * | 5/2011 | Chang | ........................... | 343/793 |
| 2012/0050011 A1 * | 3/2012 | Forster | ......................... | 340/10.1 |

* cited by examiner

*Primary Examiner* — Huedung Mancuso
(74) *Attorney, Agent, or Firm* — Muncy, Geissler, Olds & Lowe, P.C.

(57) ABSTRACT

An UHF RFID antenna for attached on any high conductive object is disclosed. The antenna radiation body has a first copper foil mounted thereon a backside surface of a FR4 glass fiber served as a ground plane, a second copper foil mounted thereon a front surface of the FR4 glass fiber as a main radiation plane. The main radiation plane contains two etched slits spaced each other. Each etched slit has a shape like a blade with a long handle. The two etched slits are mirror symmetry and a trench formed to connect the two etched slits for a RFID tag seated thereon so that There are short circuit microstrip and a feed-in microstrip are generated.

12 Claims, 7 Drawing Sheets

RFID TAG ANTENNA FOR ATTACHED ON HIGH CONDUCTIVE OBJECT

FIELD OF THE INVENTION

The present invention pertains a miniature antenna structure, particularly, to an antenna structure for an ultra-high frequency RFID chip.

DESCRIPTION OF THE PRIOR ART

Since the late of twentieth century, the Internet communication technology flourishes, and nowadays the communication era further leaps from a wired technology to wireless. Among the communication technologies pushing the wireless communication hit, a radio frequency identification hereinafter called RFID, may be the prominent role and cannot be lacked.

RFID chip is a tiny chip, having types of an active and a passive. The active type RFID requires a battery electrically attached to provide power in any time. The passive type RFID is, however, without a battery and thus no power is consumed but it can be called back by a RFID reader. The latter provides an electromagnetic inductive current to activate the RFID. The RFID chip has a small capacity of non-volatile memory provided for a RFID reader to read-out/write-in some useful information. Therefore, the RFID can be applied to objects stream management and can be seen everywhere. For example, a RFID embedded in a smart card is served as a ticket of mass transportation (MRT), and the RFID implanted into a pet is served as a pet identification chip, More widely used is served as an Electronic article surveillance (EAS) in the exit and/or entrance of bookstores, supermarkets, hypermarkets, electronic security systems products (Electronic article surveillance EAS). In addition, air cargo and baggage, food resume, access cards, transportation, agricultural production and transportation operations, etc., everywhere, its importance is evident.

However, the readability and/or reliability by a RFID reader will be lost or be discount if a RFID chip directly disposed on an object having high conductivity such as a metal plate. In practice, the troubles are difficult to avoid. For example, the applications including a car remote control key, a gadget with RFID embedded in a tire for sending signal are usually contact directly with a metal object. Furthermore, a RFID chip has features of low resistance but high capacitance and demands a miniature antenna for work normally. All of above inferior factors will increase the difficulty of a miniature-antenna of RFID chips designation.

The present invention is to provide such miniature antenna for a RFID direct contact with a high conductivity material such as metal.

SUMMARY OF THE INVENTION

An object of the present invention is to provide a miniature antenna for RFID, with a frequency band between about 922 MHz to 928 MHz.

Another object of the present invention is to provide a miniature antenna for RFID with a ground plane, which can be attached directly on any high conductive object and still can be accessed within a generally acceptable distance.

The present invention discloses an ultra-high frequency band RFID antenna, comprises (1) a first copper foil mounted on a rear surface of a dielectric substrate served as a ground plane for attaching on any conductive plate; (2) a second copper foil has an etched pattern mounted on a front surface of the dielectric substrate served as a main radiation plane, wherein the etched pattern includes a pair of etched slits, and each etched slit includes a first portion and a second portion. The first portion is wider than the second portion so that the etched slit with a shape like a blades associated with a long handle. The two etched slits spaced from each other and back to back mirror symmetry but there is a trench interconnects the two second portion and a RFID chip is attached on the center of the trench.

The main radiation plane comprises (1) a short circuit microstrip being a portion of the second copper foil connected to the ground plane and with three sides enclosed by the trench, and the two long handle etched slits, (2) a feed in microstrip being a portion of said second copper foil and with three sides enclosed by the trench, and the two blades-like etched slits, and (3) a periphery microstrip being the remnant portion of said second copper foil and said main radiation plane.

The short-circuit microstrip has a length little bit smaller than one half of the length of the main radiation body. The length of the short-circuit micro strip is about $0.24\lambda$ where the $\lambda$ is the wavelength in harmonic resonate. For a length of the main radiation body is concerned, the length of the short-circuit microstrip is between about 31.5 mm to 33 mm, and 32.5 mm is preferred.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The frequency bands of RFID chips opened for public are varied with countries, typically, the frequencies including 125 KHz, 134.2 KMHz, 13.56 MHz, 850 MHz to 960 MHz in ultra-high frequency range, and 2.45 GHz-5.8 GHz in micro-wave range. In Taiwan, the frequency band of RFID chips opened are of 922 MHz-928 MHz. Accordingly, an equivalent circuit of a RFID chip for a working frequency of 925 MHZ, a mid value of a 922 MHZ-928 MHZ, can be expressed by a R-C (resistor-capacitors) circuit having an impendence Z=11−j131. That is a small resistance in series with a high capacitance. The following designation for a miniature antenna will base on the forgoing impedance in the frequency ban of a 922 MHZ-928 MHz. To obtain a maximum power transfer, a matched antenna for the RFID chip, the impedance would be or at least near a complex conjugate of the impendence Z.

Figure 1:
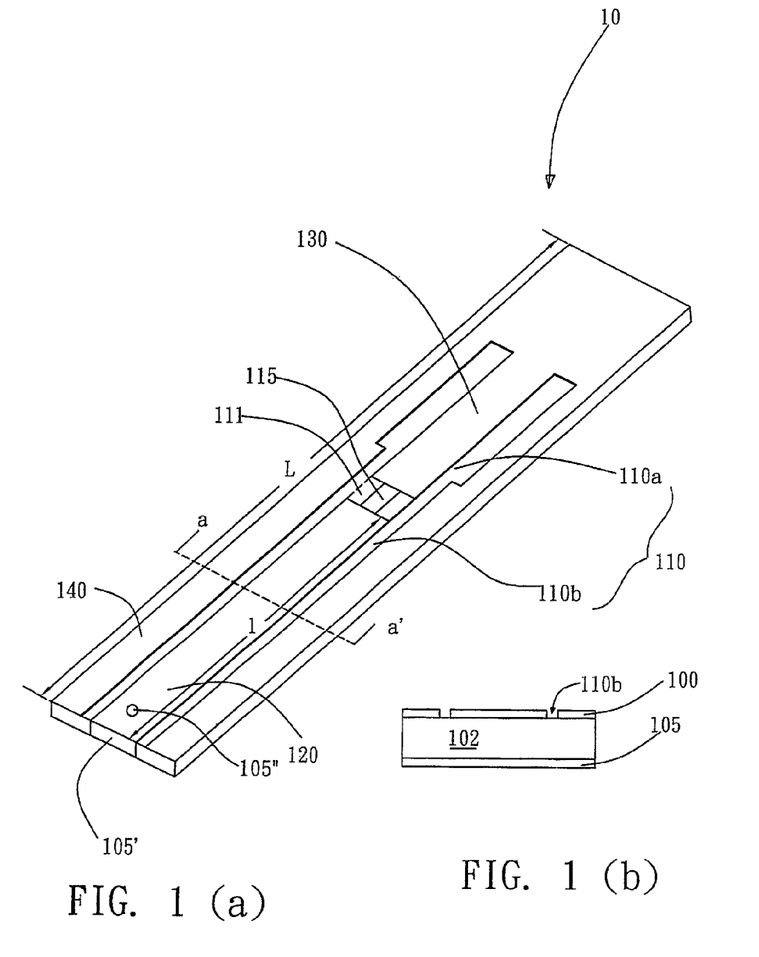
FIG. 1(a) shows a perspective view of a RFID antenna for ultra-high frequency according to the present invention.
FIG. 1(b) is a cross-sectional view along a line a-a' in FIG. 1A.

Referring to FIG. 1A, it shows a perspective diagram of a RFID antenna for ultra-high frequency according to the present invention. FIG. 1B is a cross-sectional view along a line a-a' in FIG. 1A. The RFID antenna 10 is formed on a dielectric substrate 102. The back-side of the dielectric substrate 102 is mounted thereon with a first copper foil as a ground plane 105. The front surface of the dielectric substrate 102 is mounted with a second copper foil 100 having a selective etched pattern thereon as a main radiation plane 100. The copper foil 105 can be attached on any conductor and can be accessed by a RFID reader without or only very little affected. The etched pattern includes two spaced etched slits 110 having a first portion 110a and a second portion 110b each. The second portion 110b is extended to one end of the main radiation plane 100. The first portion 110a has a width wider than that of the second portion 110b. The two spaced etched slits 110 have a shape like a pair of blades associated with a pair of long handles 110 back to back mirror symmetry. An interconnect trench 111 further connects two spaced second portion 110b. The trench 111 is for a RFID tag 115 seated thereon. Accordingly, the main radiation plane 100 is divided into a short circuit microstrip 120, a feed-in micro-strip 130, and a periphery micro-strip 140, as shown in FIG. 1A.

The short circuit microstrip 120 is a portion of the second copper foil enclosed by the two second portion 110b, and the trench 111 and further be grounded to the ground plane 105 of the antenna body, through either a metal strip 105' or a through hole 105' having a conductive material formed on the sidewall of the hole 105' or filled in the hole 105'. The feed-in micro-strip 130 is another portion of the second copper foil from an upper end of the trench 111 to the ends of the two second portion 110a. The RFID chip 115 can be inducted by a RFID reader (not shown) thereby generating a current flow through the feed-in micro-strip 130 so that the RFID tag (chip) 115 can be accessed.

According to an embodiment of the present invention, the miniature antenna body have the specification as follows: the main radiation plane 100 has a size of 66 mm×13 mm and the first portion 110a and the second portion 110b of the etched slits 110 has a width of 2 mm and 1 mm, respectively. The short circuit micro-strip 120 has a length/between about 31.5 mm to 33 mm. In the best mode, the length l of the short circuit microstrip 120 is of 32.5 mm. The length L of the main radiation body 100 is closed to or beyond a one second, i.e. (½)-wavelength of the harmonic mode of the UHF RFID chip 115.

In Taiwan, the frequency band opens to public is in between about 922 MHZ to 928 MHz and the dielectric substrate is FR4, which has a relative dielectric constant $\in_r$=4.4. Accordingly, the wavelength λ in harmonic mode is of about 154.3 mm, expressed as λ=154.3 mm.

A half of the theoretical value of the wave length is 77.2 mm. Since, there are some factors have to further take into account so that the length L of the main radiation body 100 is preferably slightly less than theoretical value one half of wave length λ. For example L is amid 64 mm to 70 mm, preferably 66 mm. The factors include: the dielectric loss tan δ=0.02 and the foil bending loss, which is due to the short circuit microstrip 120 grounded to the ground plane 105. Surely, for a dielectric substrate with a different relative dielectric constant and a different UHF frequency band, the length L of the main radiation body 100 will be varied according to the spirit of the present invention.

Figure 2A:
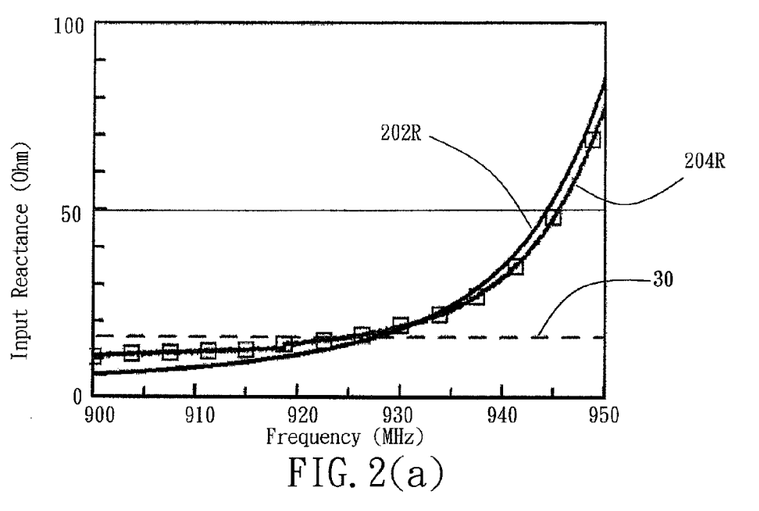
FIG. 2(a) shows a real part of the impedance for a radiation plane having a physical size of 66×13 mm2 by measuring and simulation.
Figure 2B:
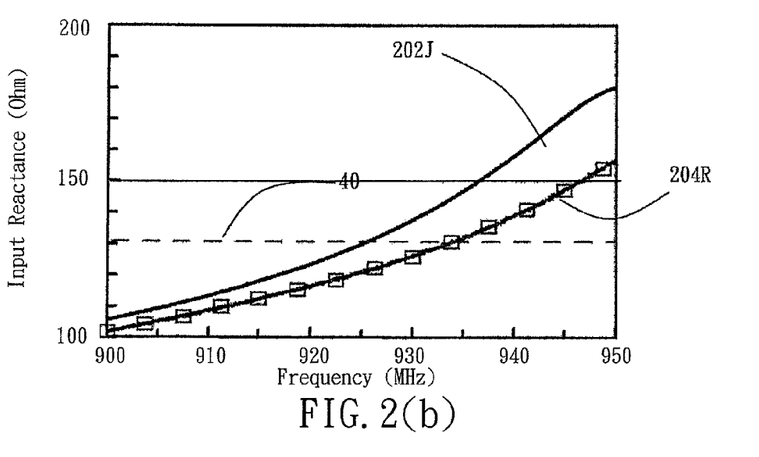
FIG. 2(b) shows a imaginary part of the impedance for a radiation plane having a physical size of 66×13 mm2 by measuring and simulation.

FIG. 2(a) and FIG. 2(b) illustrate curves 202R, and 202J, respectively, for the real part impedance and imaginary impedance part according to the results of the computer simulation under conditions of antenna main radiation 100 has a length L of 66 mm and the working frequency band is of about 922 MH$_z$ to 928 MH$_z$. The sum of the real part impedance and imaginary impedance gives the impedance 13+j131 ohms. The other two curves 204R and 204J are results, respectively, the real part impedance and the imaginary part impedance by measurement, which give a sum of 15+j125 ohms. The impedance of 13+j131 ohms or impedance of 15+j125 ohms is close to a complex conjugate impendence of 11+j131 ohms of the RFID chip 115 having the impendence of 11−j131 ohms. The dash line 30 is the real part impedance of the RFID chip and the other dash line 40 represents the imaginary part impedance of the RFID chip.

Figure 3:
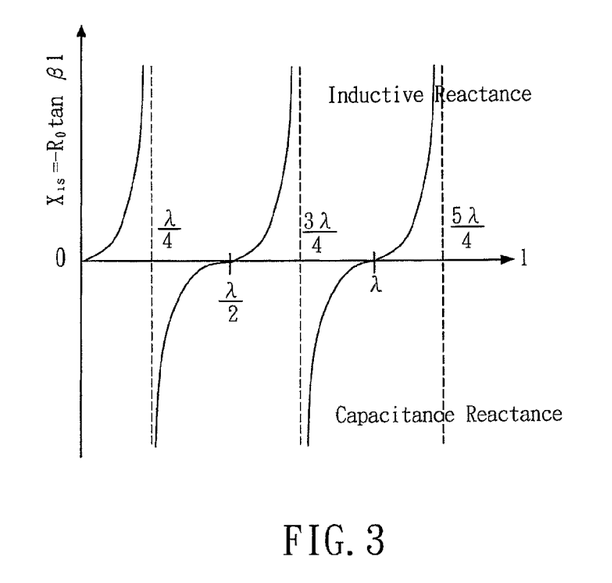
FIG. 3 shows a relationship of an input reactance of a short-circuit strip versus $n/4\lambda$.

On the other aspect, the input reactance $Z_i$ of the transmission line can be expressed by an equation:

$$Z_i = R_0 \frac{Z_L + jR_0 \tan\beta l}{R_0 + jZ_L \tan\beta l}$$

wherein $Z_L$ is the load impedance, l is a length of short circuit of short circuit of micro-strip 120. The input reactance equation can be simplified to $Z_{is}=jX_{is}=jR_0 \tan\beta l$. The dependence of the length l of the short circuit micro strip 120 on the input reactance is shown in FIG. 3. It shows the impedance presents a pure inductive reactance when the length l of the short circuit micro strip 120 is smaller than 0.25λ. But the impedance will become pure capacitive reactance while l between 0.25λ to 0.5λ. Thus, according to a preferred embodiment of the present invention, the length l of the short circuit micro strip 120 is preferred to be l<0.25λ so as to match the capacitive reactance of the RFID chip.

Figure 4A:
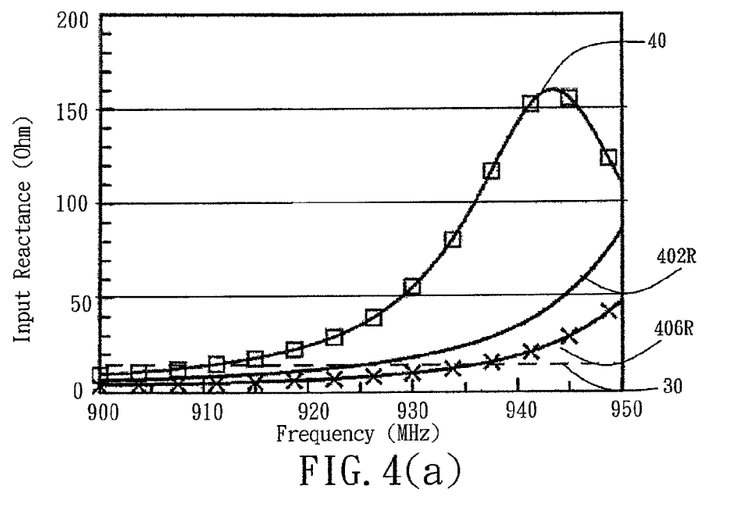
FIGS. 4(a) and (b) show a relationship of a real part impedance and imaginary part impedance of antenna by simulation versus length of short circuit micro-strip, respectively.
Figure 4B:
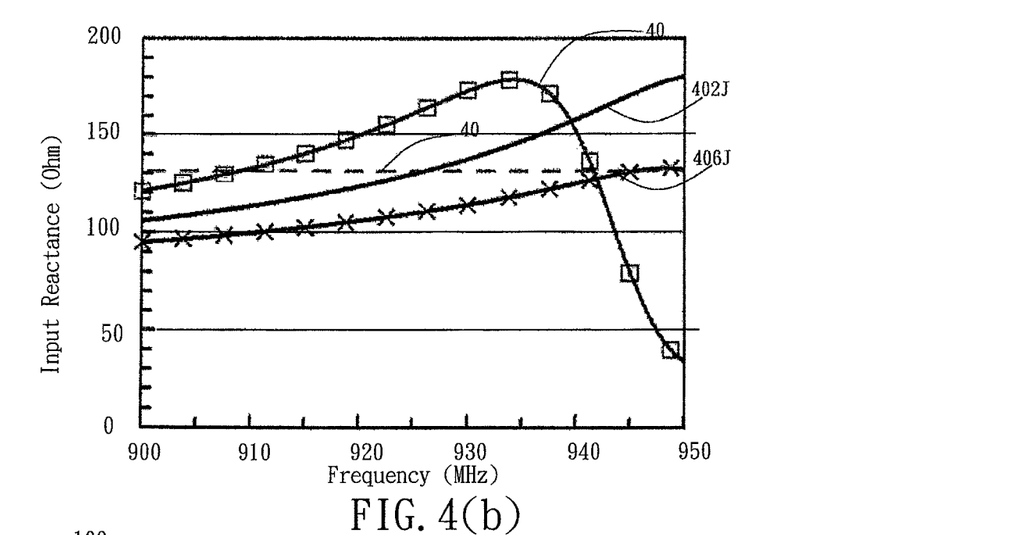

Referring to FIG. 4(a), the curves 402R, 404R, and 406R are real part impedances by simulation, corresponding to 32.5 mm, 33.5 mm, and 31.5 mm of the length l of the short circuit micro strip 120, respectively. In FIG. 4B, the curves 402J, 404J, and 406J are imaginary part impedances by simulation, corresponding to 32.5 mm, 33.5 mm, and 31.5 mm of the length l of the short circuit micro strip 120, respectively. According to the comparisons shown in FIGS. 4A, and 4B, the l<0.25, the short circuit micro strip 120 provides inductive reactance. The longer of the length l is, the greater of the inductive reactance would be. The length l of the short circuit micro strip 120 is preferred to be l=0.24λ, which presents a better matching with the 11−j131 ohms of the RFID chip.

Figure 5A:
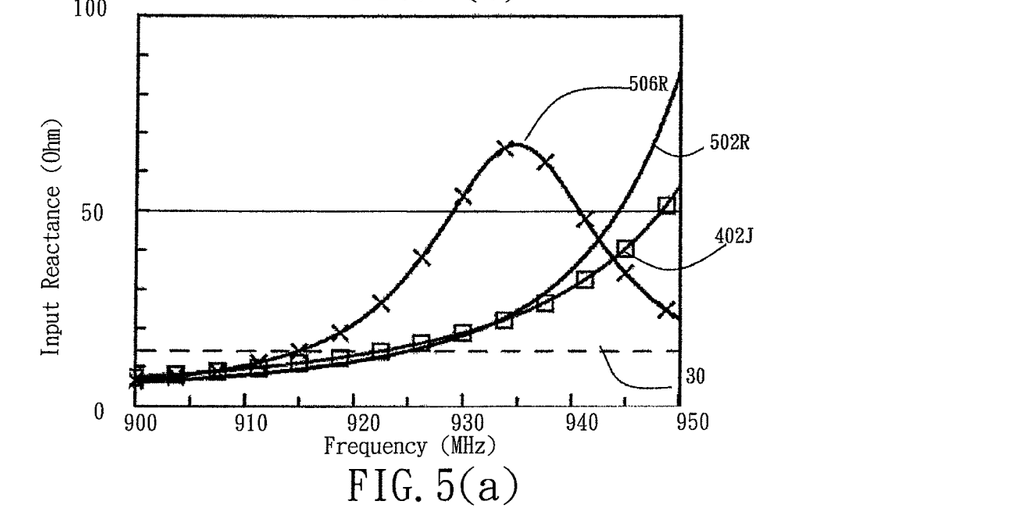
FIGS. 5(a) and (b) show a relationship of a real part impedance and imaginary part impedance of antenna by simulation versus slit width of feed-in micro-strip, respectively.
Figure 5B:
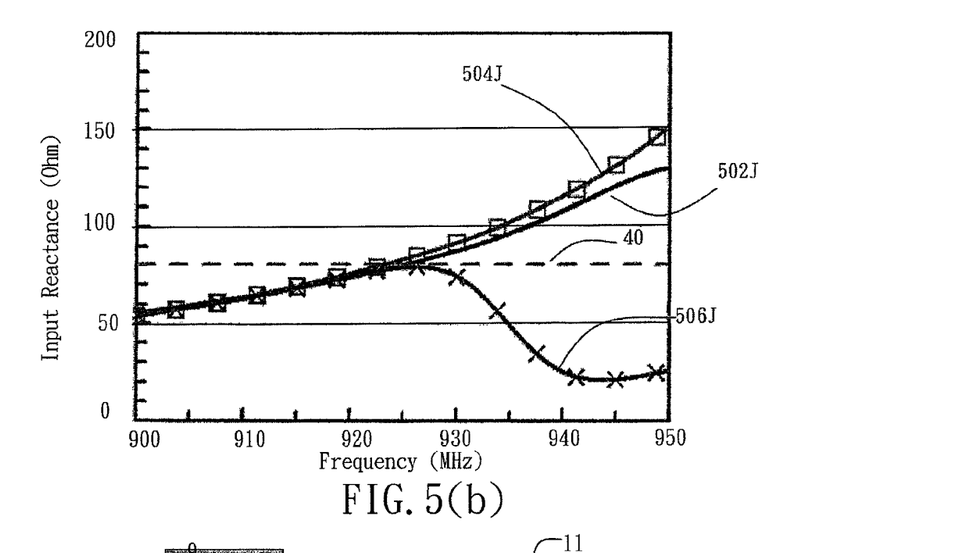

Referring to FIG. 5(a), the curves 502R, 504R, and 506R are, the real part impedances by simulation, respectively, represent for 2 mm, 3 mm, and 1 mm in slit interval between the main radiation plan and the feed-in micro-strip 130 under forgoing UHF RFID frequency band. In FIG. 5B, the curves 502J, 504J, and 506J are imaginary part impedances portion as aforementioned.

In comparison of the results shown in FIGS. 5A, and 5B, a better impedance matching is found when the slit width of the feed-in micro-strip 130 is two folds of slit width of the short circuit micro strip 120. When the slit width of the feed-in micro-strip 130 is of 1 mm, the same as the slit width of the short circuit micro strip 120, the real part impedance is found a little bit higher than that of the RFID chip.

Figure 6A:
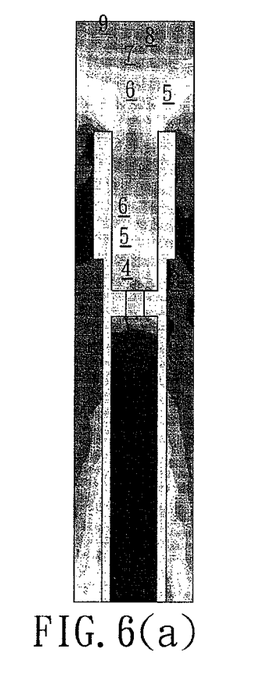
FIGS. 6(a) and (b) illustrate the current distributions on the main radiation plane and the ground plane, respectively.
Figure 6B:
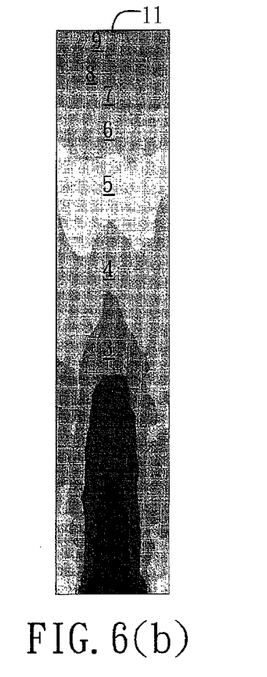

Referring to FIG. 6(*a*) and FIG. 6(B), The figures illustrate the current distributions on the main radiation plane 100 and the ground plane 105. The numeral numbers, 1-11 indicate an intensity order of the currents. The "1" represents the highest current intensity and the "11" represents the weakest current intensity. According to the simulated data, the current value is 3.5×e A-m(ampere-meter) in the region "1", 7.8 A-m in the region 5 and 1.9×e−1 A-m in the region "11". The results show the region near the short circuit micro-strip 120 has a higher current distribution.

Figure 7A:
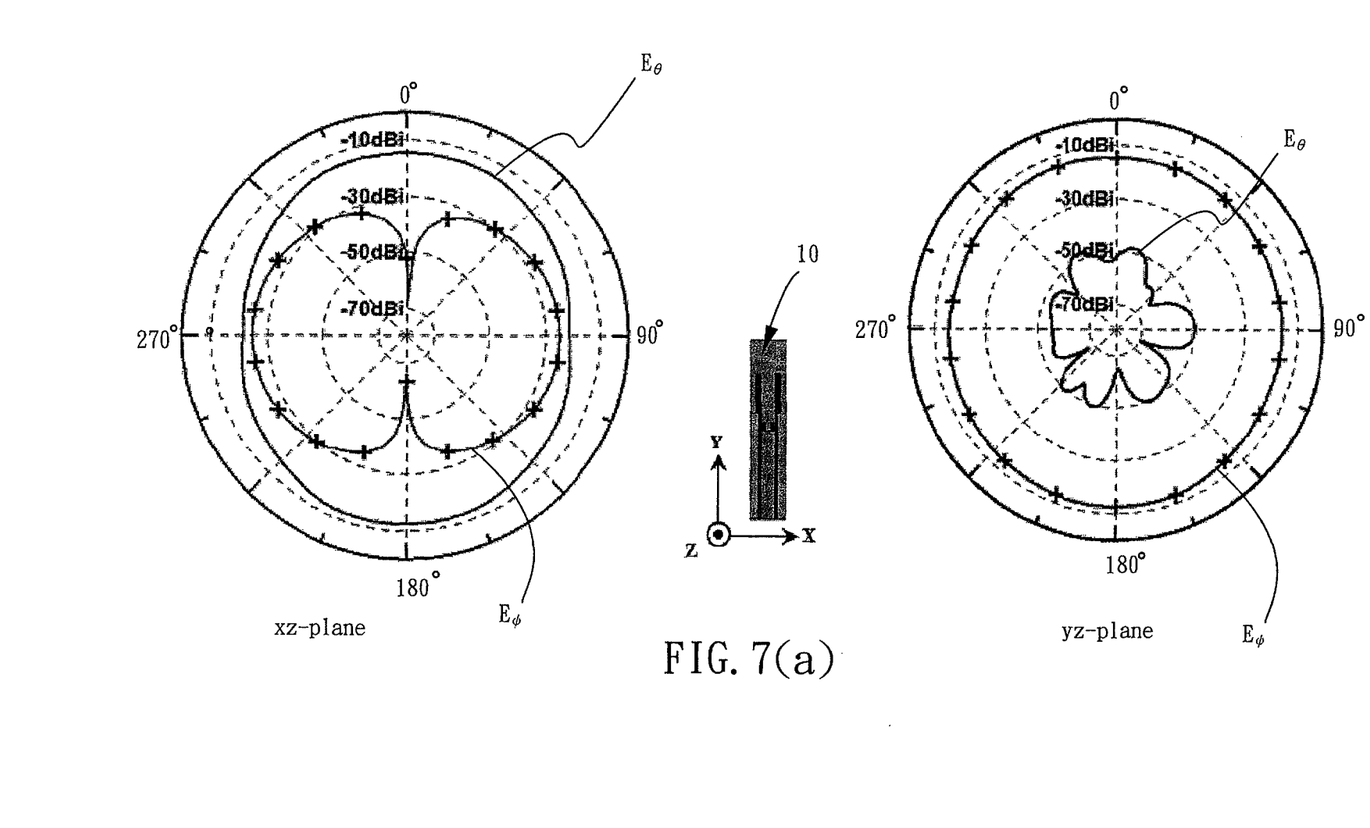
FIG. 7(a) shows 2-dimensional radiation field diagram on x-z plane and y-z plane of simulated results while the antenna of UHF RFID is put in the free space.

Referring to FIG. 7(*a*), it shows 2-dimensional, radiation field diagram of simulated results while the main radiation plane is mounted with an UHF (925 MHz) RFID chip but the antenna, including the ground plane is put in the free space. In FIG. 7(*a*), it presents bi-directional, 0° and 180° absorption in the X-Z plane. Please refer to the radiation field in $E_1$ component but almost isotropic directional absorption radiation field is found in the y-Z plane, Please refer to the radiation field in $E_6$ component.

Figure 7B:
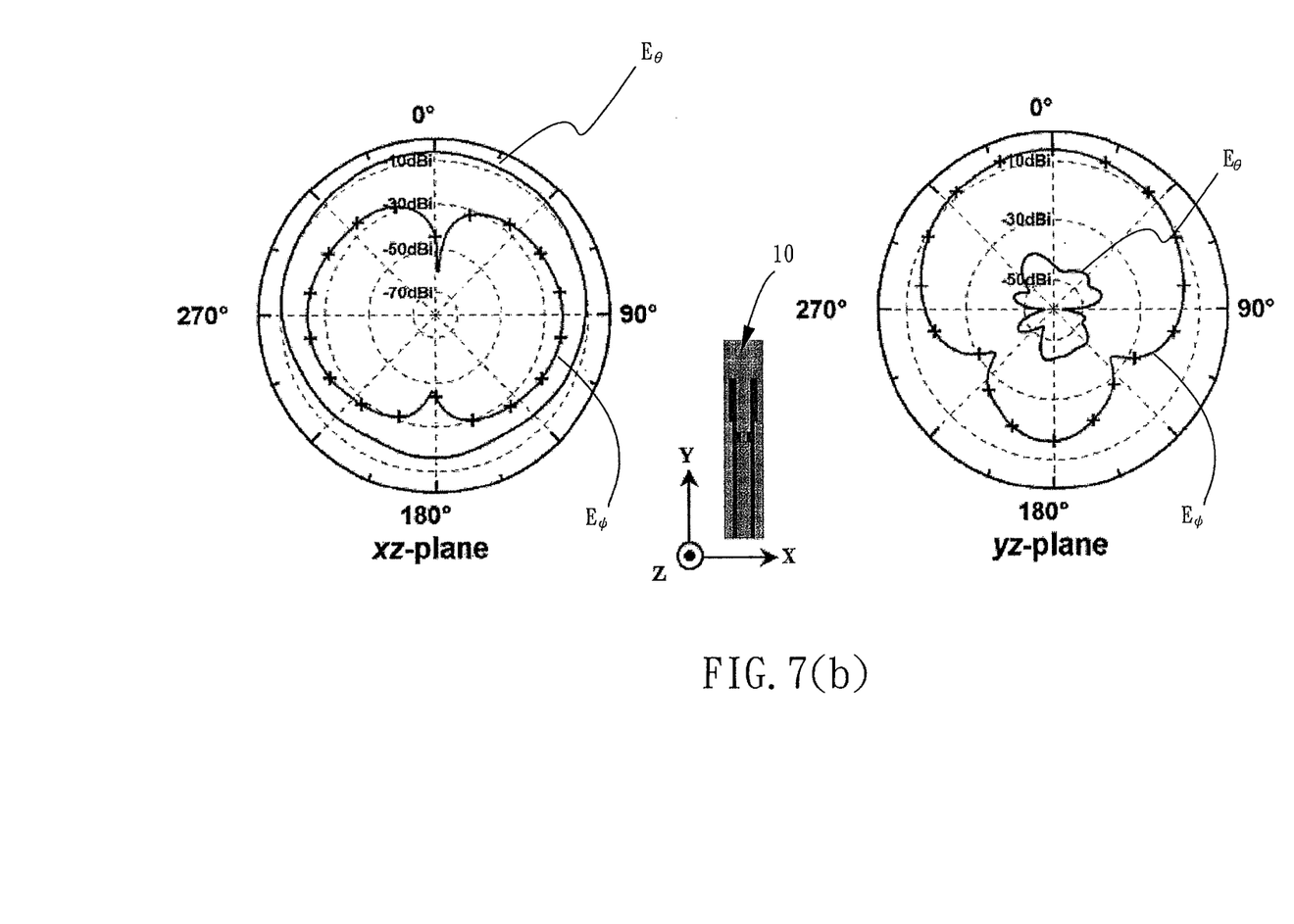
FIG. 7(b) shows 2-dimensional radiation field diagram on x-z plane and y-z plane, of simulated results while the antenna of UHF RFID is laid on a high conductive object.

Referring to FIG. 7(*b*), it shows 2-dimensional radiation field diagram of simulated results while the main radiation plane is mounted with an UHF925 MHz RFID chip but the ground plane of antenna is placed on a high conductive plate 80×80 mm in size. FIG. 7(*b*) shows the x-z plane radiation field in $E_1$ component, has a higher pointing-directional in 0° than in 180°, The pointing-directional in 0° absorption for the ground plane of the antenna placed on a conductor is higher than that of it disposed in the free space. In the y-z plane radiation field shown in $E_8$ component, the pointing direction in 0° is more significant. Furthermore, the pointing-directional in 0° absorption for the ground plane of the antenna placed on a conductor is higher than that of in free space.

According to the aforementioned simulated results, a UHF RFID antenna can be approached if one half wavelength cavity harmonic oscillation is utilized, The length of short circuit micro-strip 120 will affect significantly the impedance of the antenna. Moreover, the slit interval 100*a* between the feed-in micro-strip and the main radiation body 100 will play a crucial role to determine whether the impedance of antenna matches with the UHF RFID chip in a frequency band between 922 MHz to 928 MHz.

The benefits of the present invention are:

The UHF RFID antenna according to the present invention can be attached on any conductive plate. The experimental result shows an effective isotropic radiated power (EIRP) is of 4 watt for 925 MHz RFID when a distance between RFID and the RFID chip is 3.2 m. under an antenna gain Gt=4 dBi. The power loss Lc in coaxial cable is found to be Lc=−1.5 dB. The minimum power measured is of 26.5 dBm while the RFID is disposed on the conductive plate. Accordingly, while the forgoing data are put in the formula:

$$r_{max} = d\sqrt{\frac{EIRP}{P_{min}G_t L_c}}$$

Accordingly, a maximum reading distance of 7.2 m can be reached. The above equation can be referred to K. V. S. Rao, P. V. Nikitin, and S. F. Lam, "Antenna Design for UHF RFID Tags: a Review and a Practical Application," IEEE Trans. Antenna Propag., vol. 53, no. 12, pp 3870-3876, December 2005.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. An ultra-high frequency band RFID antenna, comprising:
    a first copper foil mounted on a rear surface of a dielectric substrate served as a ground plane for attaching on any conductive object;
    a second copper foil having an etched pattern mounted on a front surface of the dielectric substrate served as a main radiation plane, wherein said etched pattern includes two spaced etched slits having a first portion connected with a second portion each and a trench interconnects two second portions; and
    a RFID chip attached on said trench;
        wherein said main radiation plane comprises (1) a short circuit microstrip being a portion of said second copper foil grounded to the ground plane and from a lower side of said trench to lower ends of two spaced second portions, (2) feed in microstrip being another portion of said second copper foil from an upper side of said trench extended to an upper ends of said first portions and (3) a periphery microstrip being the remnant portion of said second copper foil.

2. The ultra-high frequency RFID antenna according to claim 1, wherein a working frequency band of said RFID antenna is between about 922 MHz to 928 MHz.

3. The ultra-high frequency RFID antenna according to claim 2, wherein a length of said main radiation plane is between about 62 mm to 70 mm.

4. The ultra-high frequency RFID antenna according to claim 2, wherein a length of said main radiation plane is between about 65 mm to 67 mm and a length of said short circuit microstrip is between about 31.5 mm to 33 mm.

5. The ultra-high frequency RFID antenna according to claim 2, wherein said two spaced etched slits are mirror symmetry about a longitudinal axis of said main radiation plane.

6. The ultra-high frequency RFID antenna according to claim 1, wherein a width of said first portion is wider than that of said second portion and with a ration about 2:1.

7. The ultra-high frequency RFID antenna according to claim 1, wherein a width of said first portion is about 2 mm.

8. The ultra-high frequency RFID antenna according to claim 1, wherein said two spaced etched slits have a shape like a pair of blade having long handle and back to back mirror symmetry.

9. The ultra-high frequency RFID antenna according to claim 1, wherein said lower ends of said second portion is a first end of said main radiation plane and an upper end of said first portion is within said main radiation plane.

10. The ultra-high frequency RFID antenna according to claim 1 wherein an impedance of said short circuit microstrip belongs to an inductive reactance.

11. The ultra-high frequency RFID antenna according to claim 1 wherein a length of said short circuit microstrip is about 0.24λ where λ is a wavelength of antenna in harmonic mode.

12. The ultra-high frequency RFID antenna according to claim 1, wherein said short circuit microstrip connected to said ground plane is through a through hole having conductive material therein or a metal strip attached on a lower sidewall of said dielectric substance.

* * * * *